United States Patent [19]
Jung

[11] Patent Number: 5,956,389
[45] Date of Patent: Sep. 21, 1999

[54] MESSAGE MONITORING METHOD IN KEYPHONE SYSTEM

[75] Inventor: Tae-Hyun Jung, Gumi, Rep. of Korea

[73] Assignee: SamSung Electronics Co., Ltd., Suwon, Rep. of Korea

[21] Appl. No.: 08/824,602

[22] Filed: Mar. 26, 1997

[30] Foreign Application Priority Data

Mar. 28, 1996 [KR] Rep. of Korea ................. 96-8883

[51] Int. Cl.[6] .................................................. H04M 3/42
[52] U.S. Cl. ................................. 379/88.12; 379/88.23
[58] Field of Search ............................. 379/88.11, 88.12, 379/88.22, 88.23, 88.24, 88.25, 88.26, 88.27, 202

[56] References Cited

U.S. PATENT DOCUMENTS

| | | | |
|---|---|---|---|
| 4,941,203 | 7/1990 | Patsiokas et al. | 379/77 |
| 5,034,975 | 7/1991 | Grimes | 379/142 |
| 5,361,295 | 11/1994 | Solomon et al. | 379/142 |
| 5,422,937 | 6/1995 | Ferrara | 379/76 |
| 5,471,519 | 11/1995 | Howe et al. | 379/221 |
| 5,481,596 | 1/1996 | Comerfor | 379/70 |
| 5,515,426 | 5/1996 | Yacenda et al. | 379/201 |
| 5,548,636 | 8/1996 | Bannister et al. | 379/201 |
| 5,559,875 | 9/1996 | Bieselin et al. | 379/202 |
| 5,651,054 | 7/1997 | Dunn et al. | 379/204 |
| 5,712,902 | 1/1998 | Florence et al. | 379/202 |
| 5,768,356 | 6/1998 | McKendry et al. | 379/201 |

*Primary Examiner*—Daniel S. Hunter
*Attorney, Agent, or Firm*—Robert E. Bushnell, Esq.

[57] ABSTRACT

A method of monitoring a message recorded by a caller in a keyphone system connected with a voice mailing system, including the steps of: programming a monitoring mode where the message can be monitored; checking if the monitoring mode is selected where there is a call incoming; and sending out the message through a speaker according to the program which has already been set, when a selection of monitoring mode is confirmed.

13 Claims, 3 Drawing Sheets

MESSAGE MONITORING METHOD IN KEYPHONE SYSTEM

CLAIM OF PRIORITY

This application makes reference to, incorporates the same herein, and claims all benefits accruing under 35 U.S.C. §119 from an application for a *Message Monitoring Method in Keyphone System* earlier filed in the Korean Industrial Property Office on Mar. 28, 1996 and there duly assigned Ser. No. 8883/1996.

FIELD OF THE INVENTION

This invention relates generally to key telephone systems and, more particularly, to a message monitoring process and keyphone apparatus using a voice mailing system in a keyphone system.

DESCRIPTION OF THE RELATED ART

Many references disclose telephone voice mail systems that allow for call screening functions as well as call interrupt or butt-in features. For example, U.S. Pat. No. 5,361,295 for an *Anonymous Interactive Telephone System* to Solomon et al. '295 discloses a device that allows for both call screening and interrupt or call butt-in features to be available to the called party when a caller uses a voice mail system. The called party can listen to the messages as it is being recorded and can establish two way communication during the recording of the message.

U.S. Pat. No. 5,471,519 for a *Communications Monitoring And Control System* to Howe et al. discloses a communications monitoring and control program where the called party can listen to a message being created by a caller. Also, the called party can establish two way communication with the caller while the caller is recording his message.

U.S. Pat. No. 5,548,636 for a *Method and Apparatus For Providing User Controlled Call Management Services* to Bannister et al. discloses a device where the called party can listen to and/or screen a call being recorded in voice mail as it is being made. In addition, the called party can establish a connection to the calling party while the calling party is recording his message.

U.S. Pat. No. 4,941,203 for a *Two-Way Radio Communication System Having Selectable Operating Modes* to Patsiokas et al. discloses a two way radio communication system having selectable operating modes. In the call screening mode, the caller's message is stored in the base station and, simultaneously, forwarded to the remote unit. During reception of the message, the remote unit can "pickup" the call and begin normal voice communications with the caller.

I have found that the preceding references are not readily able to be incorporated directly into keyphone systems. In addition, I notice that these efforts do not provide to the user a mechanism for allowing the user to selectively engage and disengage the call screening feature and the voice mail feature for each extension in a keyphone system. I have found that what is needed is a programmable keyphone system where the user can select which extensions can be monitored and which extensions cannot be monitored.

SUMMARY OF THE INVENTION

An object of the present invention is to provide an apparatus and process for monitoring a message, which a caller is presently recording in a voice mail box, while a called party can hear the recorded message through a speaker.

Another object is to provide an apparatus and process for enabling the called party to talk to the caller where the called party takes up the handset while the caller is recording the message in the voice mail box.

To achieve the objects of the present invention, there is provided an apparatus and a method of monitoring a message recorded by a caller in a keyphone system connected with a voice mailing system, by programming a monitoring mode where the message can be monitored; checking if the monitoring mode is selected where there is a call incoming; and sending out the message through a speaker according to the program which has already been set, when a selection of monitoring mode is confirmed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The voice mailing system (VMS), which aims at storing and reproducing voice, has functions such as audiotext, automatic attendant, and voice mailing. The voice mailing function performs recording, reproducing, copying and transferring a vocal message in a voice mail box. A voice mailing system records and transfers voice to another voice mail box with reference to the voice mail box number. Recording-in-absence function is one of the mailing functions.

Conventionally, if an extension of the keyphone system receives a call where the recordingin-absence function of the system was selected, the call is transferred to the extension's mail box of the voice mailing system so that the caller can record his/her message on the voice mail box. At this time, there is a disadvantage in that a called party cannot simultaneously hear the message recorded by the caller.

In the practice of the present invention where a voice mailing system is connected to a keyphone system, the user can monitor a message which a caller is recording. The message can be monitored in an absence mode, thereby to stop the recording and allow the called party to make a phone call with the caller when the called party picks up the handset. For such functions, extensions of a keyphone should be set to a recording-in-absence or monitoring mode. In the recording-in-absence mode, the caller's message is not monitored while the message is being recorded. In the monitoring mode, the message can be monitored while being recorded. These functions are described with reference to FIGS. 1 through 4.

Figure 1:
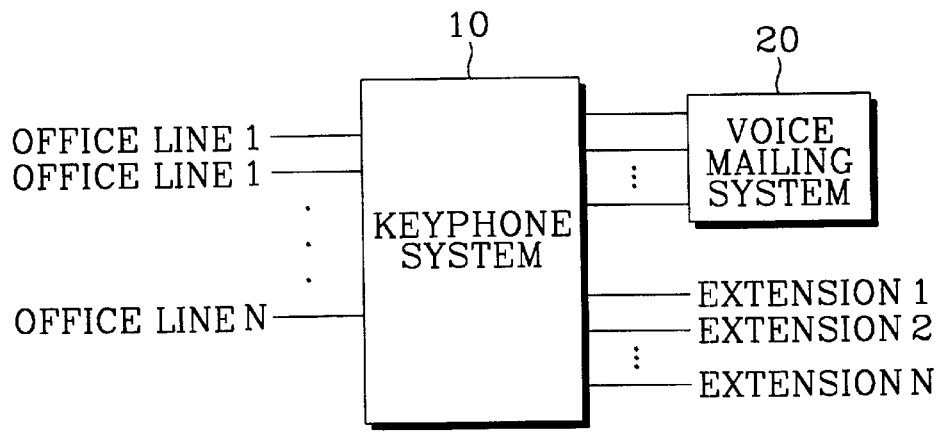
FIG. 1 illustrates the connection of a keyphone system and voice mailing system.

As shown in FIG. 1, a keyphone system 10 for forming a communication path between office lines 1 to N and extensions 1 to N, is connected to the voice mailing system 20. The extensions 1 to N are connected to a general telephone or keyphone.

Figure 2:
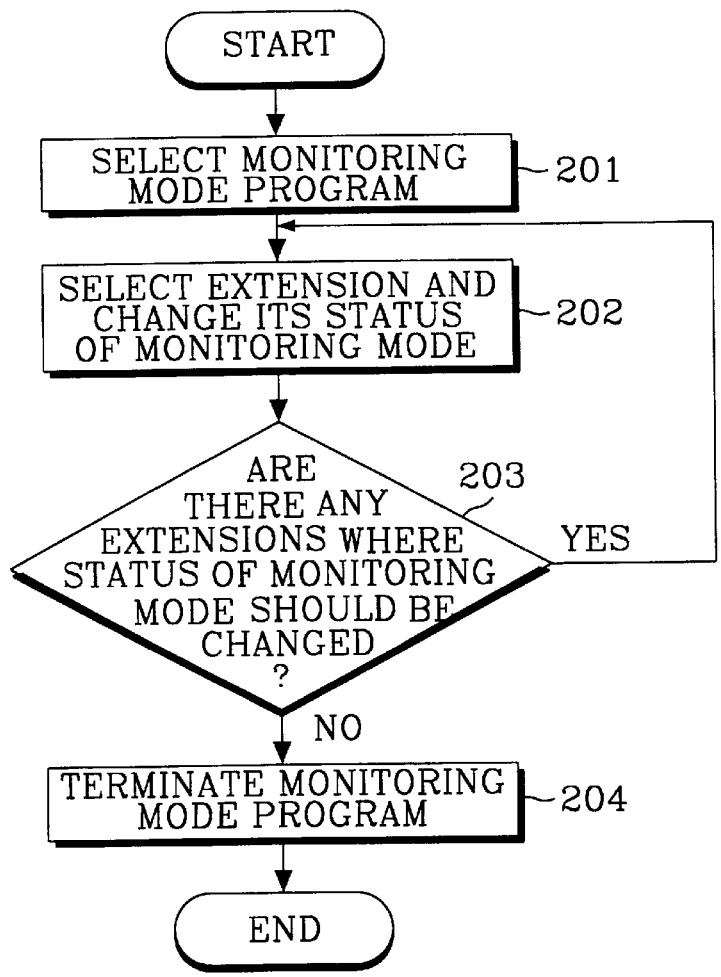
FIG. 2 is a flow chart for programming a recording-in-absence mode constructed according to the principles of the present invention.

FIG. 2 is a flow chart for establishing and canceling the monitoring mode. As shown in FIG. 2, the monitoring mode program is selected (step 201). Some extension is selected for the purpose of changing its monitoring mode, and then its monitoring mode is selected or canceled (step 202). If there is another extension where the status of monitoring mode is to be changed (step 203), step 202 will be performed repeatedly until the last extension's monitoring status is changed. When there are no more extensions where the status of the monitoring mode is to be changed, the program ends (step 204).

Figure 3:
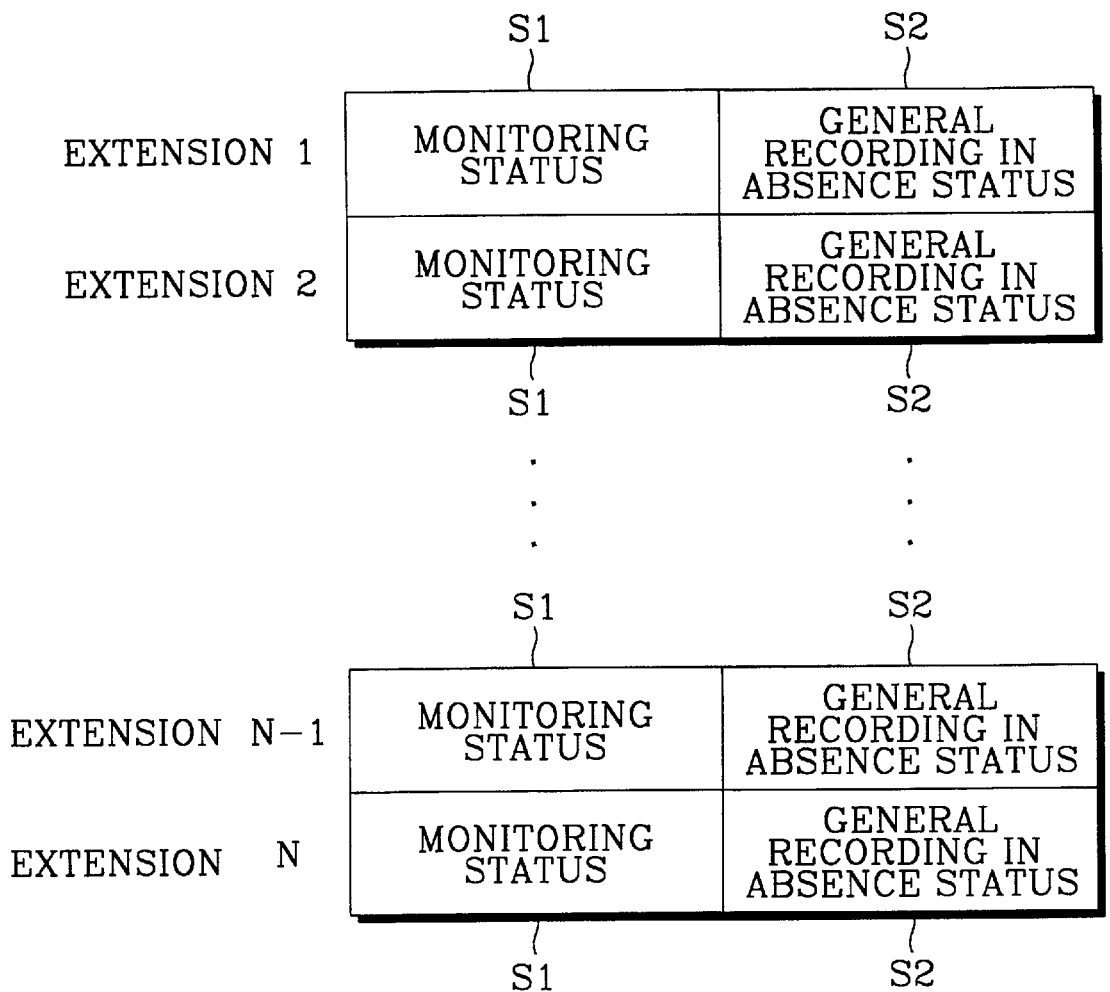
FIG. 3 illustrates the configuration of a monitoring mode program.

FIG. 3 illustrates a configuration of the monitoring mode program of FIG. 2. As shown in FIG. 2, monitoring status Si and recording-in-absence status S2 are one bit, respectively. When the monitoring status Si is a high level logical value "1", the caller's message can be monitored while being recorded. When the monitoring status Si is a low level logical value "0", the message is not monitored. When the recording-in-absence status S2 is a high level logical value "1", the caller's message is recorded. When the recording-in-absence status S2 is a low level logical value "0", the recording-in-absence mode is canceled and recording is not performed.

Figure 4:
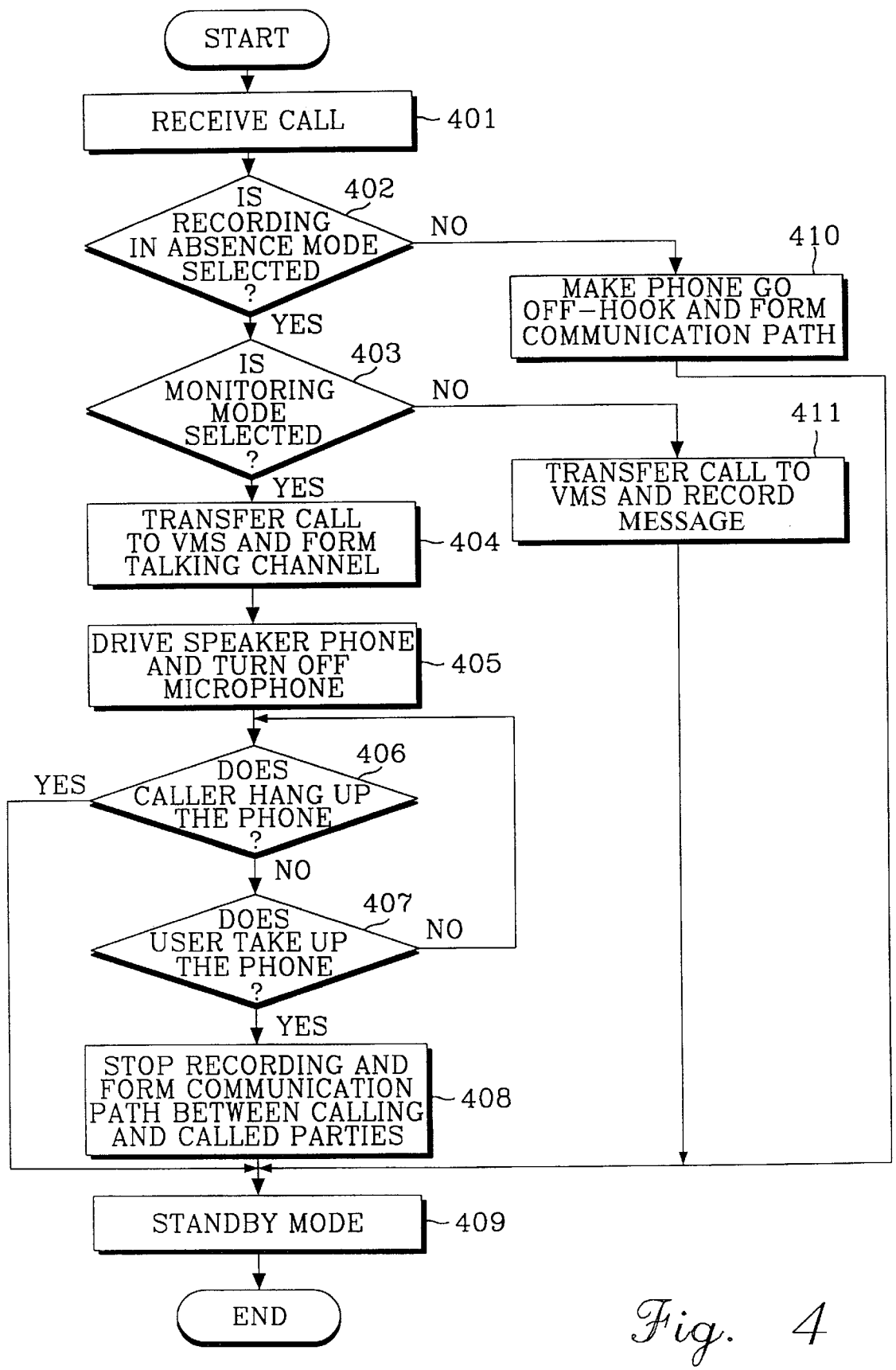
FIG. 4 is a flow chart for the practice of the present invention.

As shown in FIG. 4, if an extension receives a call (step 401), selection of the recording-in-absence mode is detected (step 402). After confirming the selection of the recording-in-absence mode, the monitoring mode is detected (step 403). If the monitoring mode is confirmed, a call incoming is transferred to the voice mailing system and a talking channel is formed (step 404). In this situation, the speaker phone of the keyphone is driven, and the microphone is turned off (step 405), so that the user can monitor the caller's message. If the caller hangs up the phone (step 407), a standby mode is established (step 409). If the user picks up the handset of the phone while the caller is talking to the system to leave a message (step 407), recording will be stopped and a communication path between calling party and called party is formed (step 408). After the conversation is over, the keyphone goes into standby mode (step 409). Alternatively, if the recording-in-absence mode is not selected at step 402, the communication will be established after the phone goes off-hook (step 410). If the monitoring mode is not detected at step 403, the call incoming is transferred to the voice mailing system and the message of the caller is recorded (step 411). Accordingly, message monitoring is available when the monitoring mode is selected in this invention having both the recording-in-absence and monitoring modes.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of monitoring a message from a caller in a telephone system connected to a voice mail system, comprising the steps of:

providing a microphone and a speaker;
   programming a monitoring mode wherein the message from the caller can be monitored;
   checking whether the monitoring mode is selected where there is a call incoming;
   operating the voice mail system when the monitoring mode is selected to cause the microphone to be turned off and the speaker to be turned on; and
   sending out the message from the caller through the speaker when the monitoring mode is selected.

2. The method according to claim 1, wherein the message from the caller is recorded, said method further comprising the steps of stopping recording and forming a communication path between the caller and a called party whenever an off-hook condition is caused by the called party while in the monitoring mode.

3. The method according to claim 1, further comprising the steps of:

determining whether a recording in absence mode is selected; and
   when the recording in absence mode is not selected, establishing an off-hook condition and forming a communication path.

4. The method according to claim 1, further comprising the steps, when the monitoring mode is not selected, of transferring the call incoming to the voice mail system and recording the message from the caller.

5. A message monitoring system, comprising:

means for conducting data signals between the monitoring system and a telephone system;
   a plurality of office lines connected to the telephone system;
   a plurality of extension lines connected to the telephone system;
   a voice mail system connected to the telephone system;
   a keyphone having a telephone handset;
   a speaker phone connected to said keyphone; and
   a microphone connected to said keyphone;
      said voice mail system causing said microphone to be turned off and said speaker phone to be driven, allowing a called party to monitor a recording of a voice mail message while said voice mail message is being recorded.

6. The message monitoring system of claim 5, said voice mail system allowing the called party to interrupt a call when said called party picks up the handset, stopping said voice mail message from being recorded.

7. The message monitoring system of claim 5, wherein said voice mail system includes means for selecting a monitoring mode in which the recording of the voice mail message is monitored by the called party.

8. The message monitoring system of claim 7, wherein a call is transferred to said voice mail system and the voice mail message is recorded when the monitoring mode is not selected.

9. The message monitoring system of claim 5, wherein said voice mail system includes means for selecting a recording in absence mode wherein an off-hook condition of said telephone handset is established and a communication path is formed.

10. A method for handling incoming calls on a voice mail system, comprising:

providing a telephone system having a plurality of office lines, a plurality of extensions, a microphone and a speaker;
   establishing a recording-in-absence mode for the voice mail system so that incoming call messages for selected ones of said plurality of extensions are recorded;
   programming a monitoring mode enabling said selected ones of said plurality of extensions to be monitored during the recording of messages;

checking if the monitoring mode is selected where there is an incoming call;

operating the voice mail system when the monitoring mode is selected to cause the microphone to be turned off and the speaker to be turned on; and sending out the message through the speaker when the monitoring mode is selected.

11. The method according to claim 10, further comprising the step of stopping recording and forming a communication path between a caller and a called party whenever an off-hook condition is caused by the called party while in the monitoring mode.

12. The method according to claim 10, further comprising the steps of:

determining whether a recording in absence mode is selected; and when the recording in absence mode is not selected, establishing an off-hook condition and forming a communication path.

13. The method according to claim 10, further comprising the steps, when the monitoring mode is not selected, of transferring the call incoming to the voice mail system and recording the message from the caller.

* * * * *